United States Patent
Satoh et al.

(10) Patent No.: US 7,635,183 B2
(45) Date of Patent: *Dec. 22, 2009

(54) INK-JET RECORDING APPARATUS

(75) Inventors: Noriaki Satoh, Aichi (JP); Junichiro Sugimoto, Aichi (JP); Ryuji Kato, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 492 days.

This patent is subject to a terminal disclaimer.

(21) Appl. No.: 11/500,891

(22) Filed: Aug. 9, 2006

(65) Prior Publication Data

US 2007/0035599 A1    Feb. 15, 2007

(30) Foreign Application Priority Data

Aug. 11, 2005    (JP) .............................. 2005-233418

(51) Int. Cl.
*G01D 11/00*    (2006.01)
(52) U.S. Cl. .............................. 347/100; 347/95; 347/85
(58) Field of Classification Search ................ 347/100, 347/95, 96, 101, 29, 84, 85, 86, 102; 106/31.6, 106/31.13, 31.27; 523/160
See application file for complete search history.

(56) References Cited

U.S. PATENT DOCUMENTS

| 2001/0044353 | A1* | 11/2001 | Nosaka et al. ............. 474/260 |
| 2005/0116984 | A1  | 6/2005  | Tsuda et al. |
| 2006/0028519 | A1  | 2/2006  | Nakamura et al. |
| 2007/0030301 | A1* | 2/2007  | Kato et al. .................... 347/21 |
| 2007/0035588 | A1* | 2/2007  | Umemura et al. ............. 347/65 |
| 2007/0103527 | A1* | 5/2007  | Satoh ......................... 347/100 |

FOREIGN PATENT DOCUMENTS

| JP | 2005-119288 | 5/2005 |
| JP | 2006-027003 | 2/2006 |
| JP | 2006-063322 | * 3/2006 |

* cited by examiner

*Primary Examiner*—Manish S Shah
(74) *Attorney, Agent, or Firm*—Banner & Witcoff, Ltd

(57) ABSTRACT

The ink-jet recording apparatus has an ink passage into which a water-based ink or a preservation solution is filled. The ink passage employs a rubber member formed from a rubber in which a butyl rubber polymer serving as a base polymer, zinc oxide serving as a vulcanization agent and a thiazole-based compound serving as a vulcanization accelerator are employed. The water-based ink includes at least a coloring agent, water and a glycol ether, an amount of the glycol ether being about 5 wt. % to about 10 wt. % with respect to the total weight of the water-based ink. The preservation solution includes at least water and a glycol ether, an amount of the glycol ether being about 5 wt. % to about 10 wt. % with respect to the total weight of the preservation solution.

9 Claims, No Drawings

INK-JET RECORDING APPARATUS

BACKGROUND OF THE INVENTION

1. Field of the Invention

The present invention relates to an ink-jet recording apparatus in which insoluble materials originating from rubber members employed in an ink passage are prevented from precipitating into a water-based ink or a preservation solution filled into the ink passage.

2. Description of the Related Art

An ink-jet recording apparatus is an apparatus for performing recording by causing ink to adhere to a recording material such as recording paper by means of an ink ejection method such as a thermal method or a piezo method. In the thermal method, ink is rapidly heated to generate bubbles, and fine droplets of the ink are ejected from fine nozzles by utilizing the pressure generated by the rapid heating. In the piezo method, fine droplets of ink are ejected by use of a piezoelectric element.

In an ink-jet recording apparatus, rubber members are employed in an ink passage comprised of an ink tank, an ink-jet head and the like. These rubber members include, but are not limited to, a cap which covers nozzles of the ink-jet head, a wiper which cleans the end face of the nozzles of the ink-jet head, a seal packing which is placed at the joint portion between components, and the like. In addition, if the ink tank is provided separately from the ink-jet head, the rubber members also include a tube which supplies ink from the ink tank to the ink-jet head, and the like.

However, when the rubber members come in contact with a water-based ink (hereinafter simply referred to as an ink) employed in ink-jet recording or with a preservation solution filled into an ink passage at the time of shipping or during long-term storage, the additives contained in the rubber members are dissolved in the ink or the preservation solution. The dissolved additives then precipitate as an insoluble material, thereby causing a problem such as clogging of nozzles of an ink-jet head.

In view of the above, a method has been proposed in US-A1-2005116984. In this method, rubber materials to be employed in an ink passage are immersed in water at 60° C. for a predetermined time in a sealed container for determining the amount of dissolved materials to thereby select suitable rubber materials.

However, the amounts and kinds of the insoluble materials precipitating into an ink or a preservation solution depend on the composition of the ink or the preservation solution. Therefore, even when the rubber materials selected by means of the method of US-A1-2005116984 are employed in the rubber members forming the ink passage, the problem of the precipitation of the insoluble materials occasionally arises. Specifically, the problem may arise when the composition of the ink is adjusted such that the ink has a dynamic surface tension preferable for ejection stability and when the composition of the preservation solution is adjusted such that the preservation solution has a dynamic surface tension preferable for replaceability with the ink and wettability.

SUMMARY OF THE INVENTION

In view of such problems in conventional technology, it is an object of the invention to prevent, in an ink-jet recording apparatus, insoluble materials originating from rubber members employed in an ink passage from precipitating. More specifically, the object is to prevent the insoluble materials from precipitating when an ink is employed which has a dynamic surface tension preferable for ejection stability and when a preservation solution is employed which has a dynamic surface tension preferable for wettability and replaceability with ink.

The present inventors have formed rubber members employed in an ink passage of an ink-jet recording apparatus from a rubber in which a butyl rubber polymer serving as a base polymer, zinc oxide serving as a vulcanization agent and a thiazole-based compound (hereinafter referred to as a thiazole-based vulcanization accelerator) serving as a vulcanization accelerator are employed. In addition, the inventors have employed an ink and a preservation solution each of which comprises a glycol ether in a specific ratio. Consequently, the inventors have found that each of the ink and the preservation solution has a dynamic surface tension at which excellent ejection stability or excellent wettability is obtained. The inventors have also found that, even when the thiazole-based vulcanization accelerator is dissolved in the ink or the preservation solution from the rubber members, the precipitation thereof as an insoluble material can be prevented since the dissolved thiazole-based vulcanization accelerator remains stable.

Accordingly, the present invention provides an ink-jet recording apparatus in which a water-based ink or a preservation solution is filled into an ink passage. In the ink-jet recording apparatus, a rubber member employed in the ink passage is formed from a rubber in which a butyl rubber polymer serving as a base polymer, zinc oxide serving as a vulcanization agent and a thiazole-based compound serving as a vulcanization accelerator are employed. In addition, the water-based ink comprises at least a coloring agent, water and a glycol ether, the amount of the glycol ether being about 5 wt. % to about 10 wt. % with respect to the total weight of the water-based ink. Furthermore, the preservation solution comprises at least water and a glycol ether, the amount of the glycol ether being about 5 wt. % to about 10 wt. % with respect to the total weight of the preservation solution.

In the ink-jet recording apparatus of the present invention, the rubber member employed in the ink passage is formed from a rubber obtained by vulcanizing a butyl rubber polymer with zinc oxide and a thiazole-based vulcanization accelerator. In addition, each of the ink and the preservation solution employed in the ink-jet recording apparatus comprises a glycol ether in a specific ratio. Therefore, even if the thiazole-based vulcanization accelerator is dissolved in the ink or the preservation solution from the rubber member, the dissolved state thereof remains stable. Hence, insoluble materials originating from the rubber are prevented from precipitating in the ink or the preservation solution filled into the ink passage.

In addition, since the ink comprises a glycol ether in a specific ratio, the ink has excellent ejection stability. Furthermore, since the preservation solution comprises a glycol ether in a specific ratio, the preservation solution has excellent wettability in the ink passage and excellent replaceability with the ink.

DETAILED DESCRIPTION OF THE PREFERRED EMBODIMENTS

The present invention will next be described in detail.

The ink-jet recording apparatus of the present invention is characterized in that rubber members employed in part of an ink passage are formed from a rubber in which a butyl rubber polymer serving as a base polymer, zinc oxide serving as a vulcanization agent and a thiazole-based compound serving as a vulcanization accelerator are employed. The apparatus is also characterized in that each of an ink and a preservation solution employed in the apparatus comprises a glycol ether in a specific ratio. The configuration of the ink-jet recording apparatus other than the above features may be the same as that of a known ink-jet recording apparatus. No limitation is imposed on an ink ejection method, and a thermal method, a piezo method or any other method may be employed.

In the ink-jet recording apparatus, the rubber members employed in a part of the ink passage include, but are not limited to, a cap which covers nozzles of an ink-jet head, a wiper which cleans the end face of the nozzles of the ink-jet head, and the like. In addition, if an ink tank is provided separately from the ink-jet head, the rubber members also include a tube which supplies ink from the ink tank to the ink-jet head. Further, the rubber members also include a seal packing which is an elastic member held between a buffer tank and a head unit, as disclosed in Japanese Patent Application No. 2004-207208.

As a base polymer of the rubber forming the rubber members, a butyl rubber polymer is employed since it has low gas permeability and is suitable for a seal packing or the like preventing drying in an ink tank. The butyl rubber polymer refers to an uncrosslinked isoprene-isobutylene rubber polymer obtained by copolymerizing isoprene and isobutylene and also refers to a compound obtained by substituting a part thereof with a halogen. Specifically, a commercial product such as HT-1066 or HT-1068 (products of JSR Corporation) may be employed.

As the vulcanization agent, zinc oxide is employed due to its high vulcanization rate. The mixing amount of zinc oxide is preferably about 2.5 parts by weight to about 7.5 parts by weight per 100 parts by weight of the base polymer of the rubber forming the rubber members. When the mixing amount of zinc oxide is too low, the rubber members are likely to swell by the ink or the preservation solution due to insufficient vulcanization. When the mixing amount is too high, insoluble materials are prone to precipitate in the ink or the preservation solution.

As the vulcanization accelerator, a thiazole-based compound is employed. The thiazole-based compound has solubility in a glycol ether. Thus, when the ink and the preservation solution comprise a glycol ether, the precipitation of the thiazole-based compound can be prevented in the ink and the preservation solution even when the compound is dissolved in the ink and the preservation solution from the rubber members. Since vulcanization accelerators other than the thiazole-based compound are not easily dissolved in a glycol ether, such effects cannot be obtained.

The larger the molecular weight of a thiazole-based compound, the lower the solubility in a glycol ether. Therefore, a thiazole-based compound having a molecular weight of about 350 or less is preferred. Specific examples of the thiazole-based compound include, but are not limited to, 2-mercaptobenzothiazole (M. W.=167) represented by the following formula (1a):

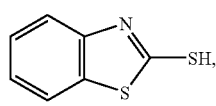

(1a)

dibenzothiazyl disulfide (M. W.=332) represented by the following formula (1b):

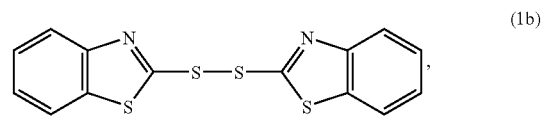

(1b)

a zinc salt of 2-mercaptobenzothiazole (M. W.=397) represented by the following formula (1c):

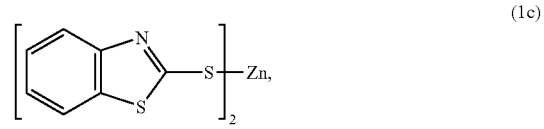

(1c)

(2,4-dinitrophenyl)-2-mercaptobenzothiazole (M. W.=333) represented by the following formula (1d):

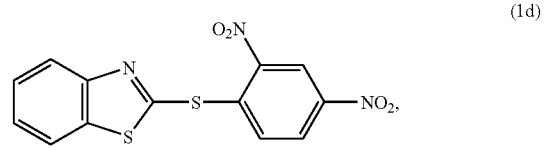

(1d)

(N,N-diethylthiocarbamoylthio) benzothiazole (M. W.=282) represented by the following formula (1e):

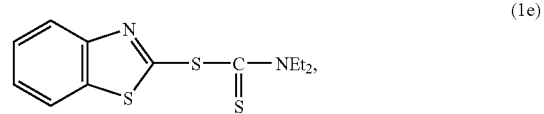

(1e)

and the like.

Of these, dibenzothiazyl disulfide represented by the formula (1b) is preferable due to its high vulcanization rate.

The preferred mixing amount of the thiazole-based compound is determined such that the appropriate vulcanization rate is obtained. That is, the mixing amount is preferably about 1 part by weight to about 3 parts by weight per 100 parts by weight of the base polymer of the rubber. When the mixing amount of the thiazole-based compound is too low, a longer vulcanization molding time is required, causing a decrease in production efficiency. When the mixing amount is too high, the dissolved amount in the ink or the preservation solution becomes large. Thus, disadvantageously, the precipitation of the compound is more likely to occur in the ink or the preservation solution.

Various additives may be added to the rubber composition in accordance with need. Examples of such additives include, but are not limited to: lubricants such as calcium stearate, stearic acid amide, magnesium oxide and the like; fillers such as carbon black, calcium carbonate, silicon dioxide and the like; softening agents such as paraffin oil and the like; antioxidants; scorch retarders; and the like.

In a method of manufacturing the rubber members from the above rubber raw material, kneading is performed by means of a kneading apparatus such as a Banbury mixer, a kneader or a twin roll mill. Further, heating is carried out normally at about 140° C. to about 200° C. for about 5 minutes to about 15 minutes in a vulcanization step for the rubber.

An ink which comes in contact with the above-mentioned rubber members in the ink passage in the ink-jet recording apparatus comprises at least a coloring agent, water and a glycol ether.

In addition, the ink preferably has a dynamic surface tension at a lifetime of 100 ms of about 35 mN/m to about 45 mN/m as determined by a maximum bubble pressure method at a measurement temperature of 25° C. By setting the dynamic surface tension at a lifetime of 100 ms as determined by the maximum bubble pressure method at a measurement temperature of 25° C. to about 35 mN/m to about 45 mN/m, ejection stability from an ink-jet head can be imparted to the ink. If the dynamic surface tension is less than about 35 mN/m, a desirable meniscus is not formed at a nozzle of an ink-jet head, thereby causing difficulty in ejecting the ink as fine droplets. Moreover, the wettability of the ink to a recording material such as paper becomes excessively high, causing deterioration of print quality. On the contrary, if the dynamic surface tension exceeds about 45 mN/m, difficulty arises in introducing the ink into an ink-jet head, thereby causing a problem that the ink is not ejected.

It has been known that the dynamic surface tension is generally determined by an oscillating jet method, a meniscus method, the maximum bubble pressure method or other method. However, the value of the dynamic surface tension defined in the present invention is determined by means of the maximum bubble pressure method.

In the determination of the dynamic surface tension by means of the maximum bubble pressure method, a gas is fed from a gas supply source to a probe to generate a bubble at the end of the probe which is immersed in an ink. At this time, the generation rate of the bubble is changed by changing the flow rate of the gas. The pressure on the bubble from the ink is changed along with the bubble generation rate change, and the surface tension is determined through this pressure. The pressure reaches the maximum (the maximum bubble pressure) when the radius of the bubble becomes equal to the radius of the end portion of the probe. Thus, the dynamic surface tension a of the ink at this moment is represented by the following equation:

$$\sigma = (\Delta P \cdot r)/2$$

wherein r is the radius of the end portion of the probe, and $\Delta P$ is the difference between the maximum pressure and the minimum pressure on the bubble.

The term "lifetime" refers to a period of time from when a bubble is separated from the probe after the pressure reaches the maximum bubble pressure to form a new surface to when the pressure again reaches the maximum bubble pressure.

The glycol ether comprised of the ink is capable of dissolving the thiazole-based vulcanization accelerator and prevents the precipitation thereof. The glycol ether also reduces the dynamic surface tension, moderately enhances the penetration rate of ink into a recording material such as paper, and improves the drying characteristics.

Specific examples of the glycol ether include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like. Of these, triethylene glycol butyl ether, dipropylene glycol propyl ether and the like are preferable since they are excellent in the capability of adjusting the dynamic surface tension and in print quality. These may be employed alone or as a mixture of two or more.

The amount of the glycol ether with respect of the total ink weight is about 5 wt. % to about 10 wt. %, and preferably about 5.5 wt. % to about 10 wt. %. When the amount of the glycol ether is too low, the precipitation of the thiazole-based vulcanization accelerator dissolved in the ink cannot be prevented. Disadvantageously, if the amount of the glycol ether is too low, the dynamic surface tension becomes excessively high, and thus difficulty arises in introducing the ink into an ink-jet head. In addition, the penetration rate of the ink into a recording material is lowered, thereby causing problems in drying time and bleeding. On the contrary, disadvantageously, if the amount of the glycol ether is too high, the dynamic surface tension becomes excessively low. Thus, a desirable meniscus cannot be formed at a nozzle of an ink-jet head, and swelling occurs in the rubber members. In addition, since the ink excessively penetrates into a recording material, the ink reaches the back surface of the recording material, and blurring occurs considerably.

A humectant for preventing drying of the ink at a nozzle and for improving the solution stability of the ink may be optionally added to the ink in addition to the glycol ether. Specific examples of the humectant include, but are not limited to: polyhydric alcohols such as ethylene glycol, propylene glycol, diethylene glycol, triethylene glycol, dipropylene glycol, polyethylene glycol, polypropylene glycol, 1,3-butanediol, 1,5-pentandiol, 1,6-hexanediol, glycerin, 1,2,6-hexanetriol, 1,2,4-butanetriol, 1,2,3-butanetriol and the like; nitrogen-containing heterocyclic compounds such as N-methyl-2-pyrrolidone, N-hydroxyethyl-2-pyrrolidone, 2-pyrrolidone, 1,3-dimethylimidazolidinone, $\epsilon$-caprolactam and the like; amides such as formamide, N-methylformamide, N,N-dimethylformamide and the like; amines such as ethanolamine, diethanolamine, triethanolamine, ethylamine, diethylamine, triethylamine and the like; sulfur-containing compounds such as dimethyl sulfoxide, sulfolane, thiodiethanol and the like; and the like. These may be employed alone or as a mixture of two or more.

The amount of the humectant depends on the composition of the ink and the desired characteristics of the ink and is determined over a wide range. Normally, the amount of the humectant with respect to the total weight of each ink is preferably about 0 wt. % to about 40 wt. %, and more preferably about 0 wt. % to about 30 wt. %. The amount exceeding about 40 wt. % is not preferable since the viscosity of the ink unnecessarily increases to potentially cause problems such as difficulty in ejecting the ink from a nozzle of an ink-jet head and significant retardation of drying on a recording material.

Further, a monohydric alcohol such as ethanol or isopropyl alcohol may be employed for the purpose of controlling the penetrability of the ink into a recording material and the drying characteristics of the ink.

In order to prevent clogging of a nozzle, an ink filter and the like caused by impurities contained in water, the water employed in the ink is not ordinary tap water but preferably high purity water such as ion-exchanged water, distilled water or ultrapure water. The amount of the water with respect to the total weight of the ink is preferably about 10 wt. % to about 98 wt. %, more preferably about 30 wt. % to about 97 wt. %, and most preferably about 40 wt. % to about 95 wt. %.

As the coloring agent, water soluble dyes typified by direct dyes, acid dyes, basic dyes, reactive dyes and the like may be employed, and various inorganic pigments and organic pigments may also be employed. In addition, a self-dispersing type pigment may be employed which is obtained by subjecting a pigment to a surface treatment.

The ink employed in the ink-jet recording apparatus of the present invention comprises generally employed additives such as a dispersing agent, a viscosity modifier, a surfactant, a pH modifier and a preservative-mildewproofing agent in accordance with need. Among them, for achieving excellent print quality and for ease of introducing the ink, a polyoxyethylene alkyl ether sulfate-based surfactant represented by the following formula is preferably employed:

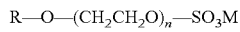

wherein R is an alkyl group having 12 to 15 carbon atoms, n is 2 to 4, and M is Na or triethanolamine. Examples of the surfactant which is commercially available include, but are not limited to: SUNNOL (a registered trademark) NL-1430, LMT-1430 and DM-1470 (products of LION Corporation); EMAL (a registered trademark) 20C, 20CM and 20T (products of Kao Corporation); SANDET (a registered trademark) EN, ET and END (products of Sanyo Chemical Industries, Ltd.); and the like.

Moreover, if the ink is applied to an ink-jet printer of a thermal type utilizing the action of thermal energy to eject the ink, an additive for adjusting thermal physical properties such as specific heat, thermal expansion coefficient and thermal conductivity may be employed.

In a conventional ink-jet recording apparatus, the ink having a dynamic surface tension of about 35 mN/m to about 45 mN/m adjusted by use of the above-mentioned components causes the precipitation of insoluble materials originating from the vulcanization accelerator into the ink. This results in that an ink filter is clogged and the ink is not ejected from a nozzle of an ink-jet head. However, in the ink-jet recording apparatus of the present invention, such problems are solved.

The preservation solution employed in the ink-jet recording apparatus of the present invention is prepared from the water and the glycol ether, and if required, an water-soluble organic solvent and the like, which are the same as those in the above-mentioned ink. However, the coloring agent may be omitted. Here, preferably, the dynamic surface tension at a lifetime of 100 ms as determined by the maximum bubble pressure method at a measurement temperature of 25° C. is adjusted to about 30 mN/m to about 35 mN/m. If this dynamic surface tension is less than about 30 mN/m, the wettability of the preservation solution to the rubber members becomes excessively high, and the penetrability also becomes excessively high, thereby causing a problem of swelling of the rubber members. On the contrary, if the dynamic surface tension exceeds about 35 mN/m, the preservation solution cannot be smoothly replaced with ink at the time of initial introduction of the ink into an ink-jet head.

In order for the preservation solution to sufficiently dissolve the thiazole-based vulcanization accelerator as well as to have such a dynamic surface tension, the amount of the glycol ether with respect to the total weight of the preservation solution is preferably about 5 wt. % to about 10 wt. %, and more preferably about 7 wt. % to about 10 wt. %.

Moreover, for ease of introducing the ink, an acetylene glycol-based surfactant represented by the following formula is preferably added:

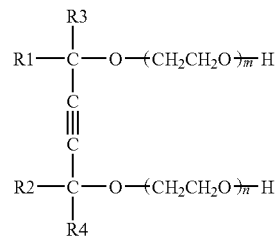

wherein the sum of m and n is 0 to 50, and R1, R2, R3 and R4 are independently an alkyl group.

Examples of the surfactant which is commercially available include, but are not limited to, OLFINE (a registered trademark) E1010 and E1004, SURFYNOL (a registered trademark) 104E (products of Nissin Chemical Industry Co., Ltd.) and the like.

EXAMPLES

The present invention will next be specifically described by way of examples.

(1) Preparation of Inks and Preservation Solutions

The compositions shown in Table 1 were employed for the inks and the preservation solutions, and all the components were stirred and mixed to obtain inks 1 to 4 and preservation solutions 1 to 4. In the ink compositions shown in Table 1, the actual mixing amount of each of the components is listed in weight percent (wt. %).

(2) Measurement of the Dynamic Surface Tension of the Inks and the Preservation Solutions The dynamic surface tension of each of the inks and each of the preservation solutions was measured by means of the maximum bubble pressure method at a lifetime of 20 ms to 5,000 ms and at a measurement temperature of 25° C. by use of an automatic dynamic surface tension meter (BP-D4, product of Kyowa Interface Science Co., LTD.). Then, the measurement value of the dynamic surface tension at a lifetime of 100 ms was read. The results are shown in Table 1.

(3) Evaluation of Ink Ejection Performance (Ejection Performance Evaluation)

Each of the inks was filled into a predetermined ink cartridge, and the ink cartridge was attached to a digital multifunction device equipped with an ink-jet printer (MFC-5200J, product of Brother Industries, Ltd.) in which the same ink had been filled into an ink passage in advance. A maintenance operation was then carried out for removing air bubbles generated in the ink passage, and the ratio of the number of nozzles having ejection failure to the total number of nozzles was determined at initial ejection immediately after completion of the maintenance operation. The ratio was evaluated by the following criteria. The results are shown in Table 3.

A: The ratio of the number of nozzles having ejection failure at the initial ejection is 10% or less.

B: The ratio of the number of nozzles having ejection failure at the initial ejection exceeds 10%.

(4) Preparation of Rubber Sheets

According to each of the rubber composition shown in Table 2, the components were successively fed to a rubber mixer, were kneaded, and were then discharged therefrom. The discharged mixture was extruded into a sheet-like shape by means of a biaxial extruder and then was subjected to vulcanization molding (at 165° C. for 7 minutes) to thereby obtain rubber sheets 1 to 5 for evaluation.

(5) Evaluation of Precipitation of Rubber (Precipitation Evaluation)

Each of the rubber sheets prepared in (4) was cut to dimensions of 50 mm length, 10 mm width and 2 mm thickness to form a sample for evaluation.

According to the combinations of experimental examples A-1 to A-20 and B-1 to B-20 shown in Tables 3 and 4, each of the above-mentioned samples was immersed into 10 mL of the ink or the preservation solution in a sealed container and was left to stand for two weeks in a thermostatic bath at 60° C. Thereafter, the immersed sample was removed. For each case, the ink or the preservation solution after the removal of the immersed sample was filtrated with an electroformed filter (a pore size of 13 μm and an effective filtration area of 8 cm$^2$) to measure the time required for the filtration.

In addition, as a control, the inks and the preservation solutions to which the sample was not added were left to stand under the same conditions as above (at 60° C. for two weeks) and were filtrated with an electroformed filter having the same specification as above to determine the time required for the filtration (the reference time). For each of the inks and each of the preservation solutions into which the sample was immersed, the ratio of the time required for the filtration to the reference time was determined and evaluated by the following criteria. The results are shown in Tables 3 and 4.

AA: the required filtration time is less than 130% of the reference time.

A: the required filtration time is at least 130% and less than 200% of the reference time.

B: the required filtration time is at least 200% and less than 400% of the reference time.

C: the required filtration time is at least 400% of the reference time.

The electroformed filters after the filtration were observed under a microscope, and it was found that the larger the ratio of the above-mentioned filtration time to the reference time, the more the amount of the precipitates.

(6) Evaluation of Introduction Performance (Introduction Performance Evaluation)

The preservation solution 3 was introduced into an ink-jet head. Subsequently, an ink was filled into a predetermined ink cartridge, and the ink cartridge was attached to a digital multifunction device equipped with an ink-jet printer (MFC-5200J, product of Brother Industries, Ltd.). A maintenance operation was carried out for removing air bubbles generated in an ink passage. Then, the ratio of the number of ink ejectable nozzles in which the preservation solution was successfully replaced with the ink to the total number of nozzles was determined at initial ejection immediately after completion of the maintenance operation. The ratio was evaluated by the following criteria. The results are shown in Table 4.

A: The ratio of the number of the ink ejectable nozzles at the initial ejection is 90% or more.

B: The ratio of the number of the ink ejectable nozzles is less than 90%.

TABLE 1

(Unit: wt. %)

|  | Ink 1 | Ink 2 | Ink 3 | Ink 4 | Preservation Solution 1 | Preservation Solution 2 | Preservation Solution 3 | Preservation Solution 4 |
|---|---|---|---|---|---|---|---|---|
| C. I. Direct Yellow 86 | 2.0 | 2.0 | | | | | | |
| C. I. Acid Red 52 | | | 2.5 | | | | | |
| C. I. Direct Blue 199 | | | | 3.0 | | | | |
| Triethylene glycol-n-butyl ether | 10.5 | 8.0 | 5.5 | 3.0 | 11.0 | 10.0 | 7.0 | 4.5 |
| Glycerin | 11.0 | 15.0 | 17.0 | 22.0 | 17.0 | 17.0 | 15.0 | 17.0 |
| OLFINE ® E1010*[1] | | | | | 0.4 | 0.4 | 0.3 | 0.3 |
| SUNNOL ® NL-1430*[2] | | 0.1 | | 0.2 | | | | |
| Proxel XL-2(S)*[3] | 0.2 | 0.2 | 0.2 | 0.2 | 0.2 | 0.2 | 0.2 | 0.2 |
| Water | Balance | Balance | Balance | Balance | Balance | Balance | Balance | Balance |
| Dynamic surface tension at a lifetime of 100 ms (mN/m) | 28.5 | 35.5 | 42.8 | 39.1 | 27.8 | 30.2 | 33.6 | 36.3 |

*[1] Acetylene glycol-based surfactant; product of Nissin Chemical Industry Co., Ltd.
*[2] Polyoxyethylene alkyl ether sulfate-based surfactant; product of LION Corporation
*[3] Mildewproofing agent; product of Arch Chemicals, Inc.

TABLE 2

(Unit: parts by weight)

|  |  | Rubber 1 | Rubber 2 | Rubber 3 |
|---|---|---|---|---|
| Polymer | Butyl rubber polymer * | 100 | 100 | 100 |
| Vulcanization agent | Zinc oxide | 5 | 5 | 5 |
| Filler | Carbon black | 50 | 50 | 80 |
| Softening agent | Paraffin oil | 30 | 30 | 30 |
| Vulcanization accelerator | Mixing amount | 2 | 1 | 1.5 |
| | Type | Thiazole-based | Thiazole-based | Thiazole-based |
| | Abbreviation | MBTS | MBT | ZnMBT |
| | Compound name | Dibenzothiazyl disulfide | 2-Mercapto-benzothiazole | Zinc salt of 2-mercapto-benzothiazole |

TABLE 2-continued (Unit: parts by weight)

| Structural formula | (benzothiazyl disulfide structure) | (2-mercaptobenzothiazole structure) | (zinc 2-mercaptobenzothiazole structure) |
|---|---|---|---|
| Molecular weight | 332 | 167 | 397 |

|  |  | Rubber 4 | Rubber 5 |
|---|---|---|---|
| Polymer | Butyl rubber polymer * | 100 | 100 |
| Vulcanization agent | Zinc oxide | 5 | 5 |
| Filler | Carbon black | 80 | 80 |
| Softening agent | Paraffin oil | 30 | 30 |
| Vulcanization accelerator | Mixing amount | 1.5 | 2 |
|  | Type | Thiuram-based | Dithiocarbamate based |
|  | Abbreviation | TMTD | ZnEDC |
|  | Compound name | Tetramethyl-thiuram disulfide | Zinc diethyldithiocarbamate |
|  | Structural formula | (TMTD structure) | (ZnEDC structure) |
|  | Molecular weight | 240 | 361 |

*: HT-1066, product of JSR Corporation

TABLE 3

| Ex. No. | Rubber No. | Ink No. | Ejection performance evaluation | Precipitation evaluation |
|---|---|---|---|---|
| A-1 | 1 | 1 | B | AA |
| A-2 | 1 | 2 | A | AA |
| A-3 | 1 | 3 | A | AA |
| A-4 | 1 | 4 | A | C |
| A-5 | 2 | 1 | B | AA |
| A-6 | 2 | 2 | A | AA |
| A-7 | 2 | 3 | A | AA |
| A-8 | 2 | 4 | A | C |
| A-9 | 3 | 1 | B | A |
| A-10 | 3 | 2 | A | A |
| A-11 | 3 | 3 | A | A |
| A-12 | 3 | 4 | A | C |
| A-13 | 4 | 1 | B | C |
| A-14 | 4 | 2 | A | C |
| A-15 | 4 | 3 | A | C |
| A-16 | 4 | 4 | A | C |
| A-17 | 5 | 1 | B | C |
| A-18 | 5 | 2 | A | C |
| A-19 | 5 | 3 | A | C |
| A-20 | 5 | 4 | A | C |

TABLE 4

| Ex. No. | Rubber No. | Preservation solution No. | Precipitation evaluation | Introduction performance evaluation |
|---|---|---|---|---|
| B-1 | 1 | 1 | AA | B |
| B-2 | 1 | 2 | AA | A |
| B-3 | 1 | 3 | AA | A |
| B-4 | 1 | 4 | B | A |
| B-5 | 2 | 1 | AA | B |
| B-6 | 2 | 2 | AA | A |
| B-7 | 2 | 3 | AA | A |
| B-8 | 2 | 4 | B | A |
| B-9 | 3 | 1 | A | B |
| B-10 | 3 | 2 | A | A |
| B-11 | 3 | 3 | A | A |
| B-12 | 3 | 4 | C | A |
| B-13 | 4 | 1 | C | B |
| B-14 | 4 | 2 | C | A |
| B-15 | 4 | 3 | C | A |
| B-16 | 4 | 4 | C | A |
| B-17 | 5 | 1 | C | B |
| B-18 | 5 | 2 | C | A |
| B-19 | 5 | 3 | C | A |
| B-20 | 5 | 4 | C | A |

As can be seen from the results in Tables 3 and 4, for the rubber sample 4 in which a thiuram-based vulcanization accelerator was employed and for the rubber sample 5 in which a dithiocarbamate-based vulcanization accelerator was employed, the precipitation evaluation results were unfavorable in all the inks and preservation solutions. On the other hand, for the rubber samples 1 to 3 in which the thiazole-based vulcanization accelerator was employed, the precipitation evaluation results were excellent in the inks 1 to 3 and the preservation solutions 1 to 3. However, since the ink 4 and the preservation solution 4 comprises a smaller amount of the glycol ether, insoluble materials precipitated from the rubber samples 1 to 3.

Since the ink 1 comprises a larger amount of the glycol ether, the dynamic surface tension thereof is less than 35 mN/m, and the ejection performance evaluation results were unfavorable. Further, since the preservation solution 1 comprises a larger amount of the glycol ether, the dynamic surface tension thereof is less than 30 mN/m. Thus, difficulty arose in the replacement with the ink in an ink-jet head, and the introduction performance evaluation results were unfavorable.

The present invention is useful as an inkjet recording apparatus which does not suffer performance deterioration due to precipitates with an ink or a preservation solution filled therein.

The entire disclosure of the specification, claims and summary of Japanese Patent Application No. 2005-233418 filed on Aug. 11, 2005 is hereby incorporated by reference.

What is claimed is:

1. An ink-jet recording apparatus comprising:
    an ink passage through which at least one of a water-based ink and a preservation solution flows; and
    a rubber member in the ink passage, said rubber member being formed from a rubber in which a butyl rubber polymer serving as a base polymer, zinc oxide serving as a vulcanization agent, and a thiazole-based compound serving as a vulcanization accelerator are employed,
    wherein the water-based ink includes at least a coloring agent, water and a glycol ether, an amount of the glycol ether being about 5 wt. % to about 10 wt. % with respect to the total weight of the water-based ink; and
    wherein the preservation solution includes at least water and a glycol ether, an amount of the glycol ether being about 5 wt. % to about 10 wt. % with respect to the total weight of the preservation solution.

2. The ink-jet recording apparatus according to claim 1, wherein
    the thiazole-based compound has a molecular weight of about 350 or less.

3. The ink-jet recording apparatus according to claim 1, wherein
    the thiazole-based compound is a compound represented by the following formula 1:

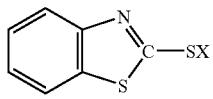
(1)

wherein X represents H,

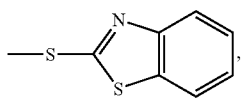

1/2 Zn,

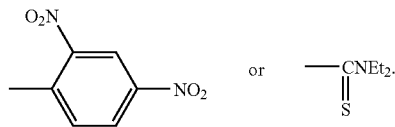

4. The ink-jet recording apparatus according to claim 3, wherein
    the thiazole-based compound is dibenzothiazyl disulfide.

5. The ink-jet recording apparatus according to claim 1, wherein
    the water-based ink has a dynamic surface tension at a lifetime of 100 ms of about 35 mN/m to about 45 mN/m as determined by a maximum bubble pressure method at a measurement temperature of 25° C.

6. The ink-jet recording apparatus according to claim 1, wherein
    the water-based ink further comprises a polyoxyethylene alkyl ether sulfate-based surfactant represented by the following formula:

wherein R is an alkyl group having 12 to 15 carbon atoms, M is Na or triethanolamine, and n is 2 to 4.

7. The ink-jet recording apparatus according to claim 1, wherein
    the preservation solution has a dynamic surface tension at a lifetime of 100 ms of about 30 mN/m to about 35 mN/m as determined by a maximum bubble pressure method at a measurement temperature of 25° C.

8. The ink-jet recording apparatus according to claim 1, wherein
    the preservation solution further comprises an acetylene glycol-based surfactant represented by the following formula:

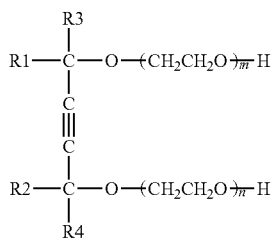

wherein R1, R2, R3 and R4 are independently an alkyl group, and the sum of m and n is 0 to 50.

9. The ink-jet recording apparatus according to claim 1, wherein
    the preservation solution does not contain any coloring agent.

* * * * *

UNITED STATES PATENT AND TRADEMARK OFFICE
CERTIFICATE OF CORRECTION

PATENT NO. : 7,635,183 B2 Page 1 of 1
APPLICATION NO. : 11/500891
DATED : December 22, 2009
INVENTOR(S) : Satoh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 627 days.

Signed and Sealed this

Ninth Day of November, 2010

David J. Kappos
*Director of the United States Patent and Trademark Office*